May 1, 1962 W. BRUCH ET AL 3,032,720
OSCILLATOR SYNCHRONIZING CIRCUITS WITH PLURAL PHASE COMPARISON MEANS
Filed Sept. 29, 1958 7 Sheets-Sheet 1
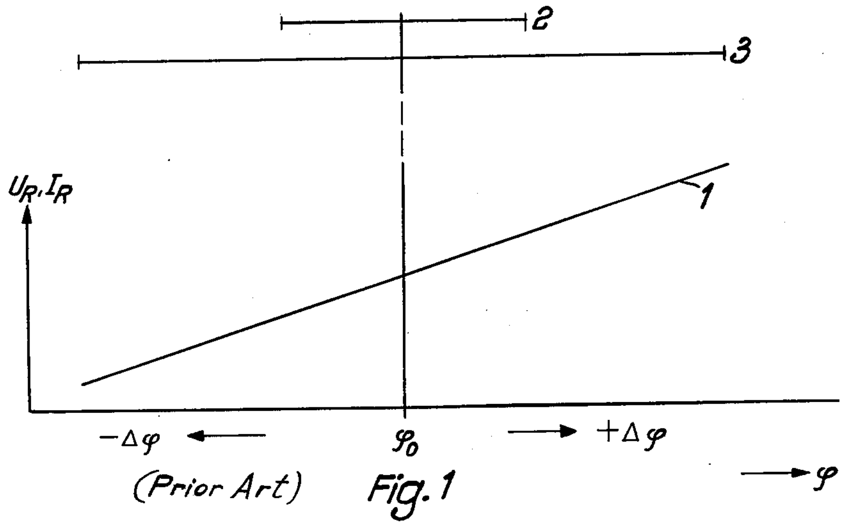
(Prior Art) Fig. 1
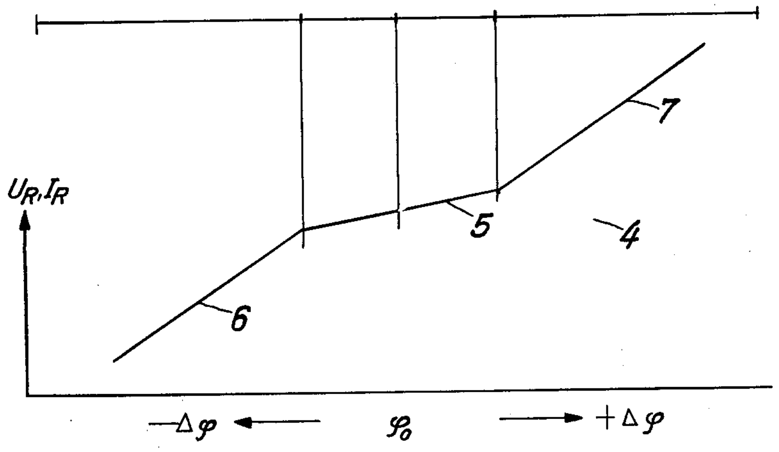
Fig. 2
Inventors:
Walter Bruch, Horst Reker & Alfred Pollak
By [signature] Patent Agent Inventors:
Walter Bruch, Horst Reker & Alfred Pollak
By [signature]
Patent Agent Inventors:
Walter Bruch, Horst Reker & Alfred Pollak
By [signature]
Patent Agent Inventors:
Walter Bruch, Horst Reker & Alfred Pollak
By
Patent Agent Inventors:
Walter Bruch, Horst Reker & Alfred Pollak
By [signature]
Patent Agent Inventors:
Walter Bruch, Horst Reker & Alfred Pollak
By [signature]
Patent Agent Inventors:
Walter Bruch, Horst Reker & Alfred Pollak
By [signature]
Patent Agent 3,032,720

OSCILLATOR SYNCHRONIZING CIRCUITS WITH PLURAL PHASE COMPARISON MEANS

Walter Bruch, Horst Reker, and Alfred Pollak, all of Hannover, Germany, assignors to Telefunken G.m.b.H., Berlin, Germany Filed Sept. 29, 1958, Ser. No. 763,961
Claims priority, application Germany Oct. 15, 1957
15 Claims. (Cl. 331—11)

The present invention relates to a circuit for synchronizing an oscillator with a sequence of synchronizing pulses.

It has been known to directly synchronize the oscillator by means of a received pulse sequence. This has the advantage that each individual pulse exactly determines the initiation of a new cycle of oscillations. However, such directly synchronized circuits have the disadvantage that spurious disturbances may also determine the starting point of a new scanning cycle and that, in case of failure of one or more pulses, the unsynchronized oscillator cycles at another frequency. For this reason indirect synchronization is today commercially used, wherein the received synchronizing pulse sequence is compared with a pulse sequence derived from a relaxation oscillator in a phase comparison circuit for generating a voltage depending upon the relative phase positions of the pulses.

In such systems, the time constant of the phase comparison circuit is designed in such a manner, that failure of a few synchronizing pulses will be disturbing to a lesser extent. Such a comparison and control circuit has two operating ranges which, generally, are designated as the pull-in range and the locked-in range. As the "pull-in range," one means to designate the range within which the control system, in case of phase or frequency deviation between the synchronizing pulses and the frequency of the controlled oscillator, can drag the oscillator back into frequency and phase coincidence. The locked-in range, however, is the range within which the phase of the local oscillator can deviate without falling out of step. Due to the pulling-in action of the circuit, the pull-in range is always substantially larger than the locked-in range. It is possible for the synchronization to suddenly drop out of step when the channel switch is changed or when switching the pulse generator in the transmitter, whereby temporarily a few synchronizing pulses are omitted and the synchronization falls outside of the locked-in range. Also poor adjustment frequently occurs when laymen operate the apparatus. Therefore, it is desirable to design control circuits of this kind for a wide pull-in range. However, a wide pull-in range requires a steep slope on the range characteristic resulting in a high susceptibility to disturbances.

It is an object of the present invention to obviate these difficulties in a circuit for synchronizing an oscillator with a synchronizing pulse sequence employing a phase comparison circuit to which is fed a voltage derived from the synchronizing pulse sequence for comparison with a voltage from the oscillator.

It is another object of the invention to provide in such a circuit an additional phase comparison circuit, the output voltage of which is a measure of the synchronization and is used to control a device for changing the control characteristic in such a manner, that the control curve in the neighborhood of the proper phase position is relatively flat, while it is relatively steep in the adjacent ranges.

Still further objects and the entire scope of applicability of the present invention will become apparent from the detailed description given hereinafter; it should be understood, however, that the detailed description and specific examples, while indicating preferred embodiments of the invention are, given by way of illustration only, since various changes and modifications within the spirit and scope of the invention will become apparent to those skilled in the art from this detailed description.

In the drawings:

FIGURE 1 shows a diagram of the control characteristic in a prior art phase comparison circuit.

FIGURE 2 shows a diagram of the control characteristic of a phase comparison circuit according to the present invention;

Figure 9:
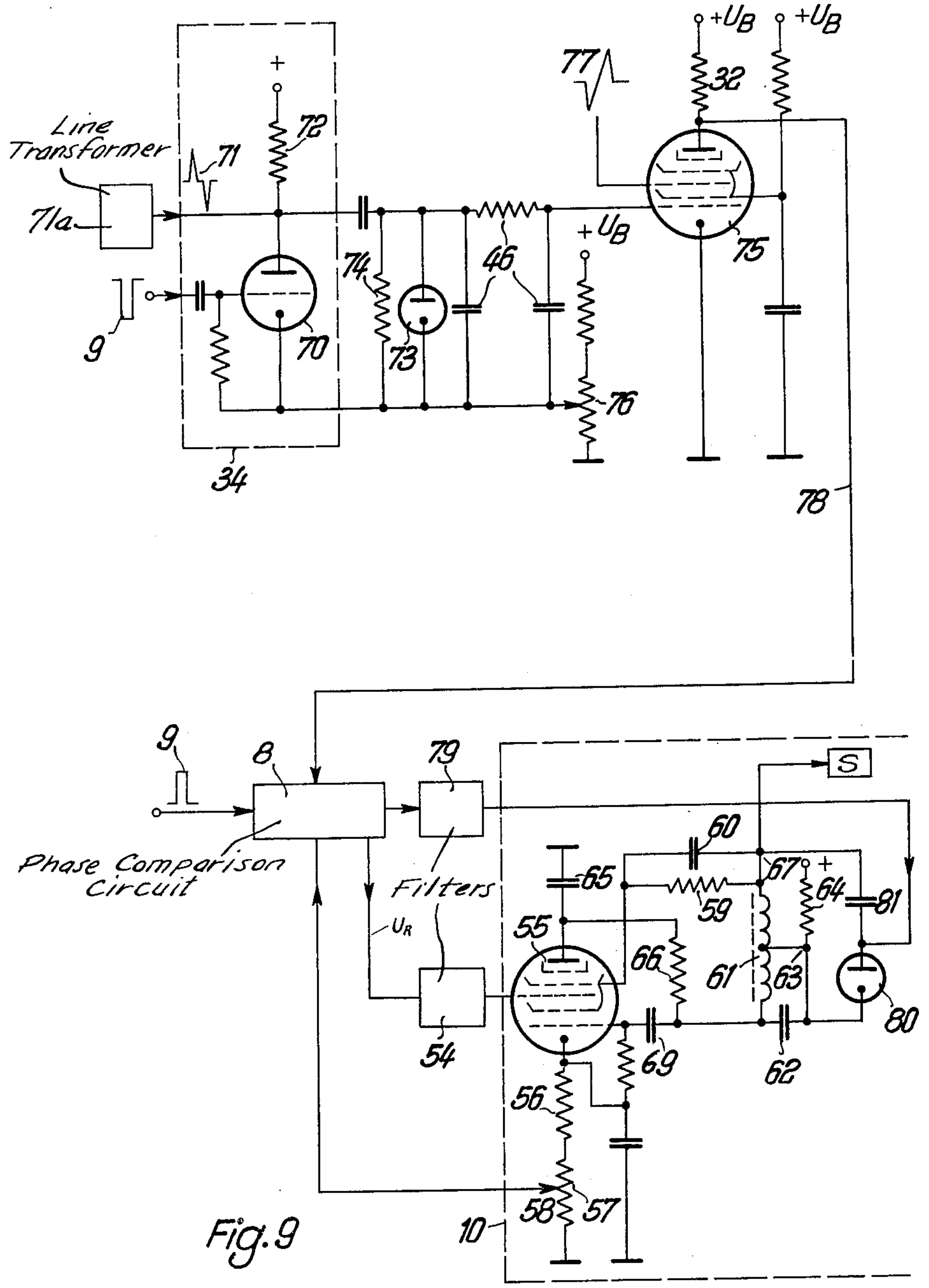
FIGURE 9 is a schematic diagram of another modified form of the present invention.
Figure 13:
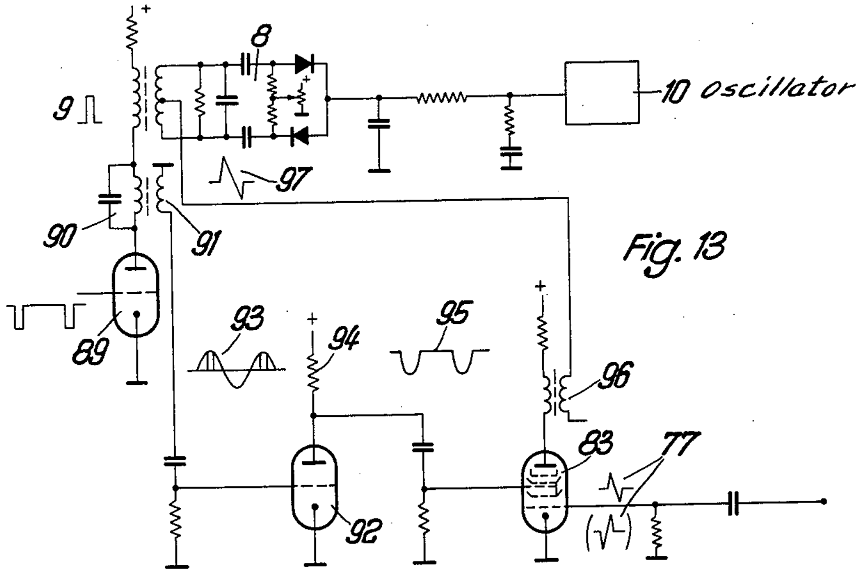
Figure 11:
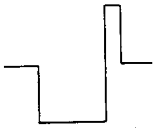
Figures 14A, 14B:
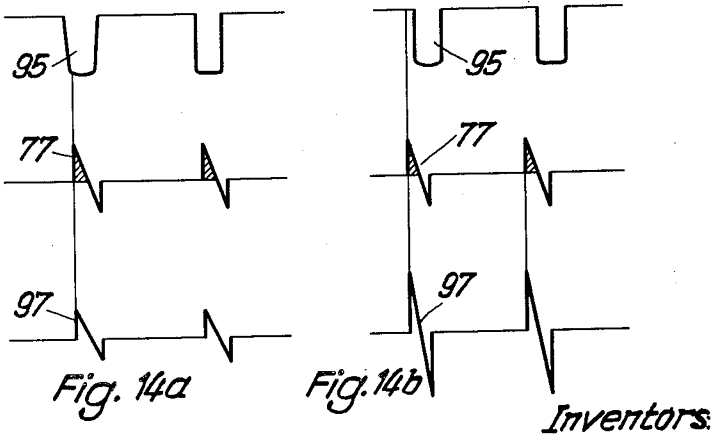
Figure 12:
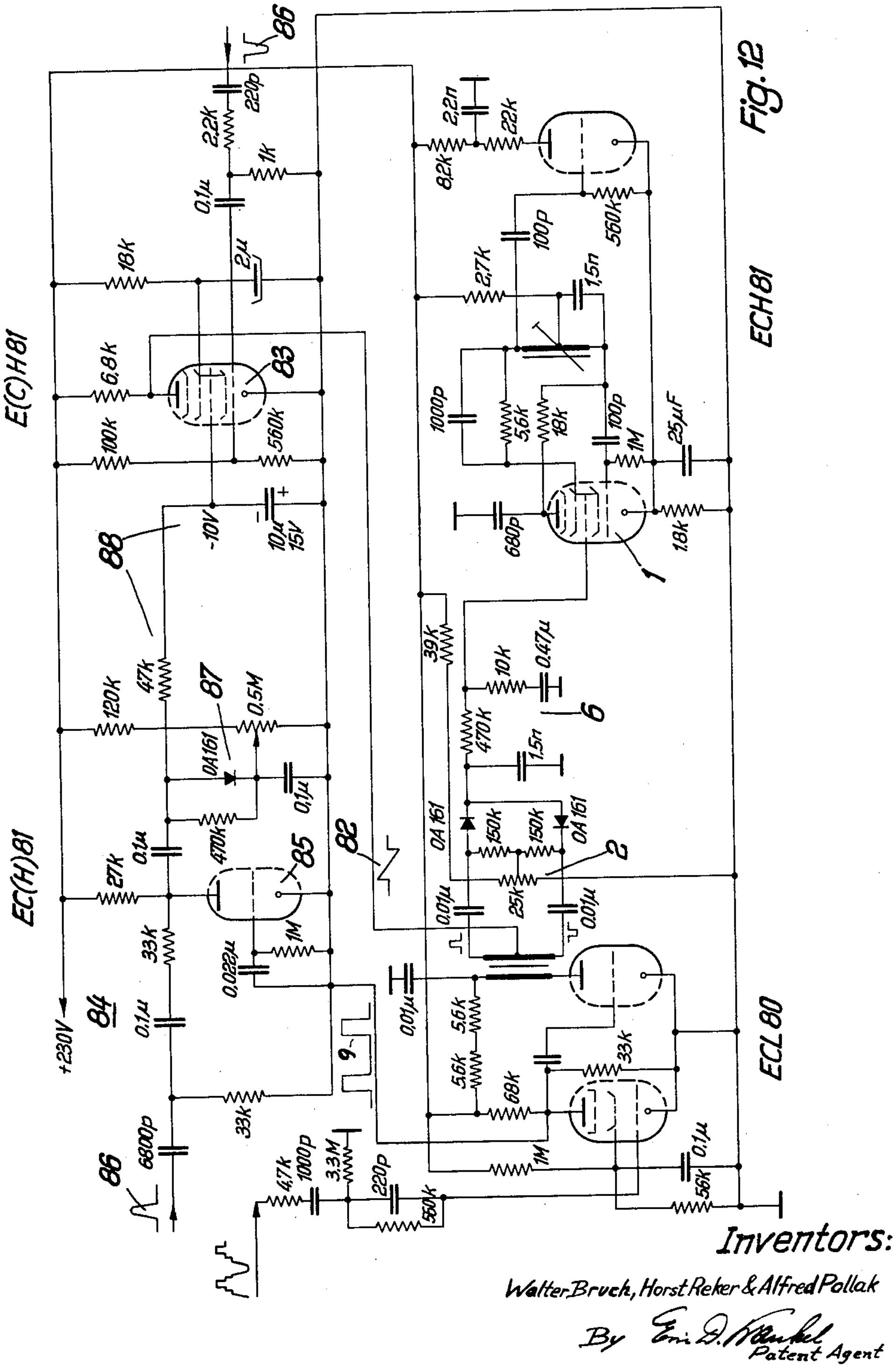

FIGURES 10*a*, 10*b*, 10*c* and 10*d* are graphical illustrations of the control characteristic variations of the circuit of FIGURE 9;

FIGURE 11 is a graphical representation of a type of coincidence pulse which can be used for phase comparison;

FIGURE 12 is the schematic diagram of a practical embodiment of the control circuit according to the present invention;

FIGURE 13 is the schematic diagram of a simplified form of coincidence circuit which could be used in the control circuit according to the present invention;

FIGURES 14*a* and 14*b* are graphical illustrations of the control characteristics of the circuit according to FIGURE 13.

The control characteristic 1 of the prior art phase comparison circuit, according to FIGURE 1, is obtained if the control voltage is plotted against the phase deviation $\Delta\varphi$ with respect to the desired center position $\varphi_0$, said control voltage being dependent upon the phase condition. In order to illustrate the different operating ranges, a lock-in range 2 and a pull-in range 3 of the synchronizing circuit are plotted above the control curve 1. It can be readily seen from this illustration that, in case of an uninterrupted sequence of synchronizing pulses, superior synchronization is assured, even in case of a relatively large phase deviation, while in case of an erroneous setting, if for example $\varphi_0$ is at the edge or outside of the locked-in range 2, a sweep which falls out of step due to disturbances cannot be locked. If the locked-in range were enlarged to avoid this disadvantage, a high sensitivity to disturbances would result.

In FIGURE 2, a control curve 4 obtained according to the invention has three slopes 5, 6 and 7. The slope 5 corresponds approximately to the locked-in range of FIGURE 1 with low control steepness. The slopes 6 and 7 have a substantially greater steepness than the slope of the curve 1 in FIGURE 1. As a result of this, there is obtained in the vicinity of the exact phase coincidence a control curve with little steepness and, therefore, an extremely low sensitivity to disturbances while, in case of larger phase deviation of the voltages to be compared, a greater control voltage is generated. The steep flanks of the slopes 6 and 7 result in a relatively high sensitivity to disturbances. However, they do quickly restore the exact phase condition.

Figure 3:
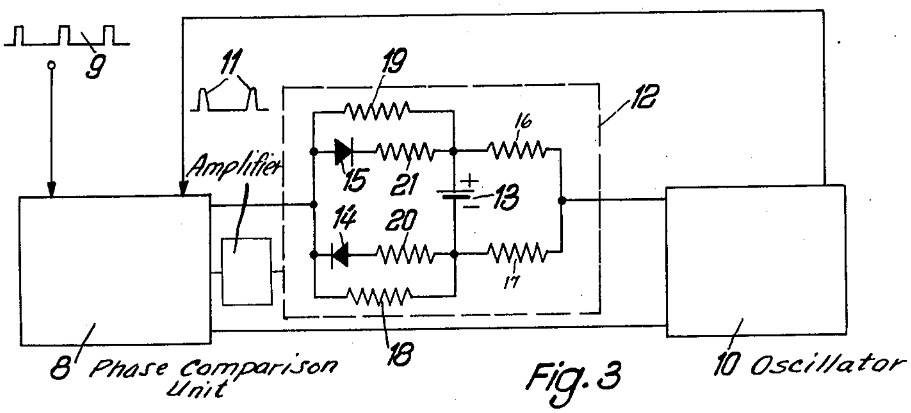
FIGURE 3 is the schematic diagram of a phase comparison and control circuit according to the present invention.

A control curve 4, such as shown in FIGURE 2, can be obtained by the circuit illustrated in FIGURE 3. This circuit has a conventional phase comparison unit 8 to which are fed synchronizing pulses 9, derived from a received signal, and comparison pulses 11, derived from an oscillator 10, comprising a relaxation oscillator and a sweep stage as illustrated schematically within the dashed lines in FIGURE 9. The comparison stage 8 is connected to the oscillator via a switching device comprising two diodes 14 and 15 biased by a voltage source 13 and connected in parallel with opposite polarity and in series with two resistances 16 and 17. The control characteristic 4 in FIGURE 2, when obtained with a circuit arrangement as described above, would have a horizontal slope within the range 5. However, a small slope for the curve is often desirable in this range. Therefore, the diodes 14 and 15 are respectively shunted by resistances 18 and 19 which may be made adjustable. Furthermore, it is often desirable to obtain smooth transition between the ranges 5, 6 and 7 of the control characteristic 4. This can be achieved by inserting series-connected resistances 20 and 21 in the circuits of the diodes 14 and 15, respectively. The switching unit 12 may either serve to control a current-sensitive control device, for example, pre-magnetized ferrite, or to obtain a corresponding control voltage across a load resistance, due to the voltage drop. In case of a voltage *e*, of the voltage source 13, this voltage *e* would be a measure of the magnitude of the slope 5. If the bias voltage *e* is not selected as a constant voltage, i.e., is made dependent upon the synchronization, for example, of the coincidence of the pulses 9 and the comparison pulses 11, the voltage *e* will be greatest at coincident of said pulses. In this case, a curve 5 of lesser steepness is obtained only in case of coincidence. As a result of this, the control steepness would vary with actual conditions and an imperfect setting or adjustment of the synchronization would not have the influence which it has in the known circuit arrangements.

Figure 4:
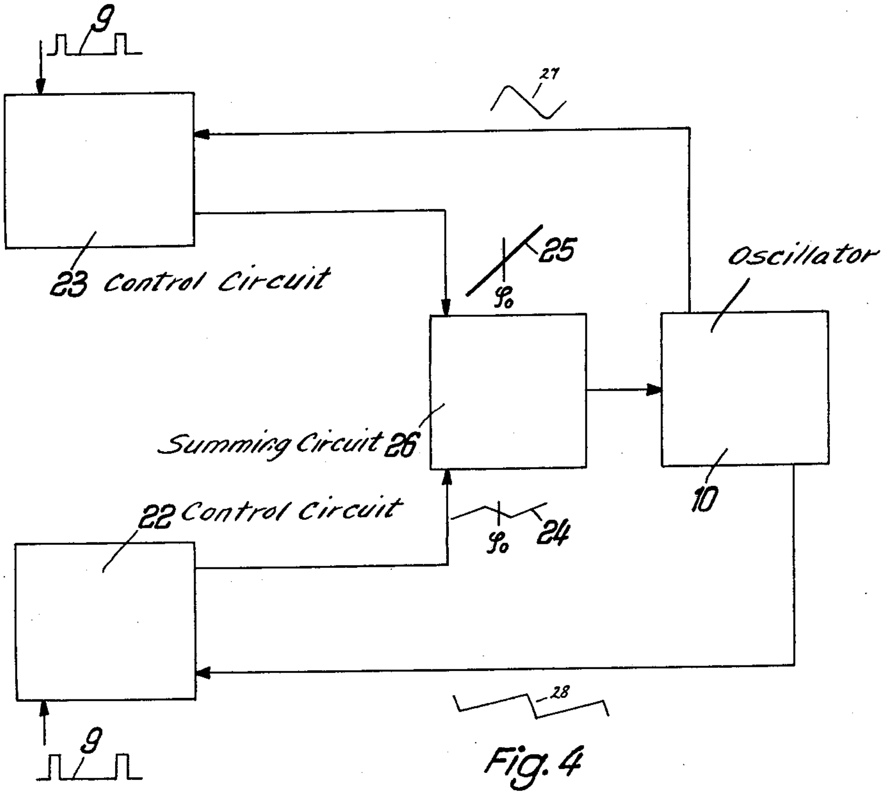
FIGURE 4 is a block diagram of a modified form of control circuit according to the present invention.

In the embodiment of the invention according to FIGURE 4, the control characteristic of FIGURE 2 is obtained by superimposing the output voltages or output currents of two control circuits 22 and 23. Of these two circuits, one, for example 22, operates within the socalled coincidence range, while the other, 23, operates over a larger phase range. The control curves 24 and 25 of the two circuits 22 and 23, respectively, are fed with opposite slope to a summing circuit 26 to which the oscillator 10 to be controlled is connected.

The phase comparison is carried out in the circuit 23 by comparing in a manner known per se the synchronizing pulses derived from the received signal, if necessary differentiated to use the leading edge, with a sine wave 27 derived from the oscillator 10. A control curve 25 of relatively great steepness is obtained with such a circuit and results in a relatively high sensitivity to disturbances. The control range is relatively broad. The circuit is designed in such a manner that the control characteristic has the shape of the curve 25. In the circuit 22, synchronizing pulses 9 are compared with a voltage wave form 28 derived from the oscillator 10 and mixed in such a manner that the control characteristic has the shape of curve 24. The latter curve also comprises a long rise and a short declining trace. By adding the curves 24 and 25, the curve 4 of FIGURE 2 is obtained.

Figure 5:
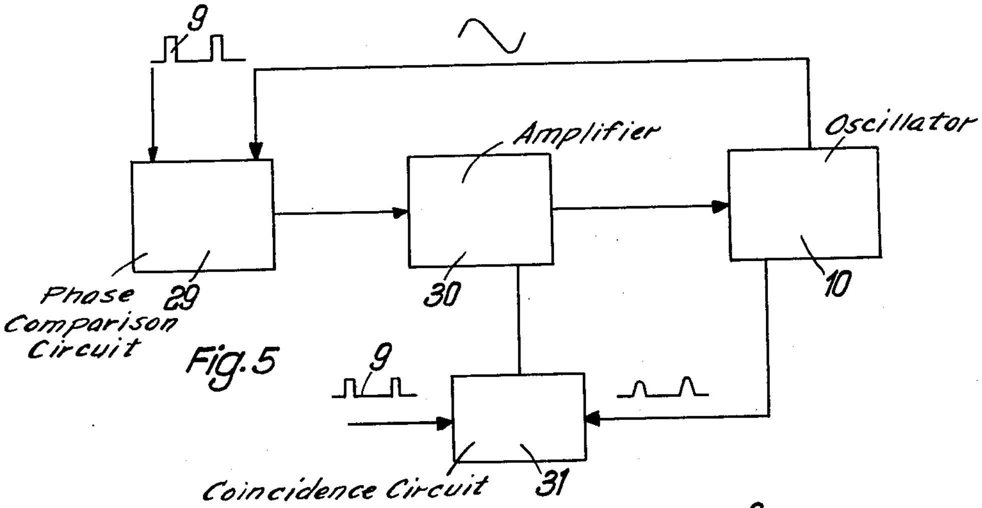
FIGURE 5 is a block diagram of another modified form of control circuit according to the invention.

Another embodiment of the invention is shown in FIGURE 5, in which a control circuit, including a phase comparison circuit 29, a control voltage amplifier 30 and an oscillator 10 is illustrated. The phase comparison circuit 29 compares the pulses 9 with a sine wave obtained from point 67 in oscillator 10, FIGURE 9, for example, and has a sinusoidal operating characteristic so that a control curve of relatively great steepness, having a large control range, is obtained. According to the invention, the amplification of the control voltage amplifier 30 is controlled by a voltage form derived from a coincidence circuit 31 which compares the pulses 9 with a pulse-like wave form derived from tap 58 of potentiometer 57 of the oscillator 10 in FIGURE 9, and the amplification is controlled in such a manner that the slope 5 of small steepness is obtained at the proper phase condition. In this case, the control voltage amplifier tube may be a hexode, to the third grid of which the voltage obtained by the comparison of the pulses is fed.

Figure 6:
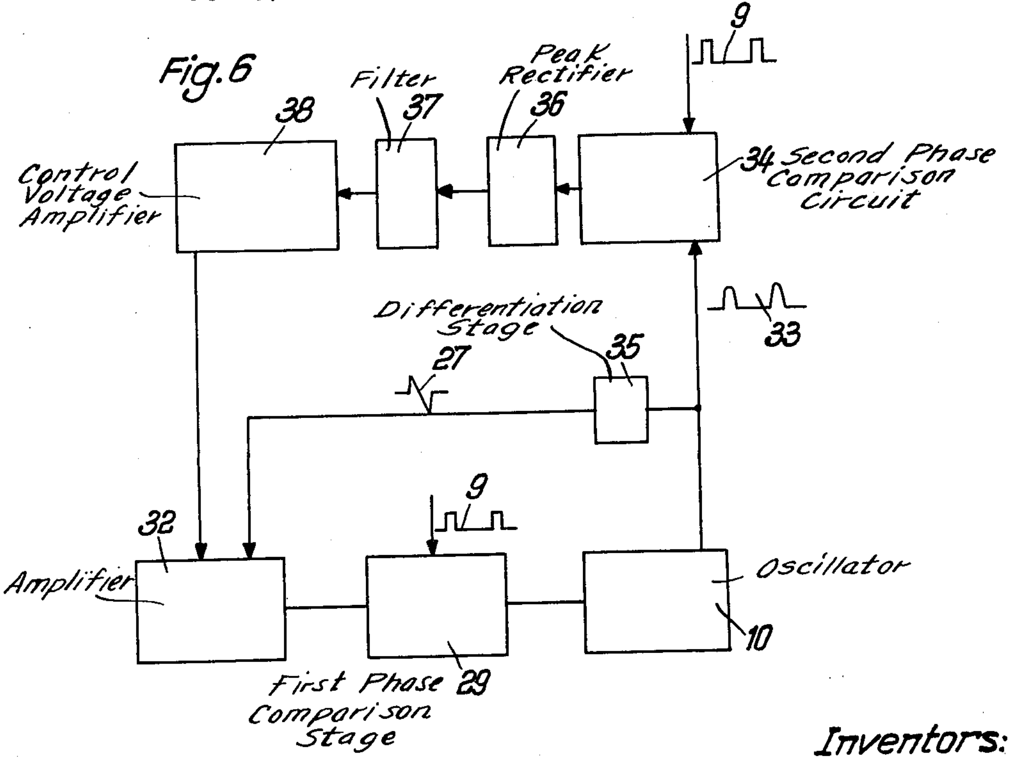
FIGURE 6 is a block diagram of a further modified form of control circuit according to the invention.
Figure 7:
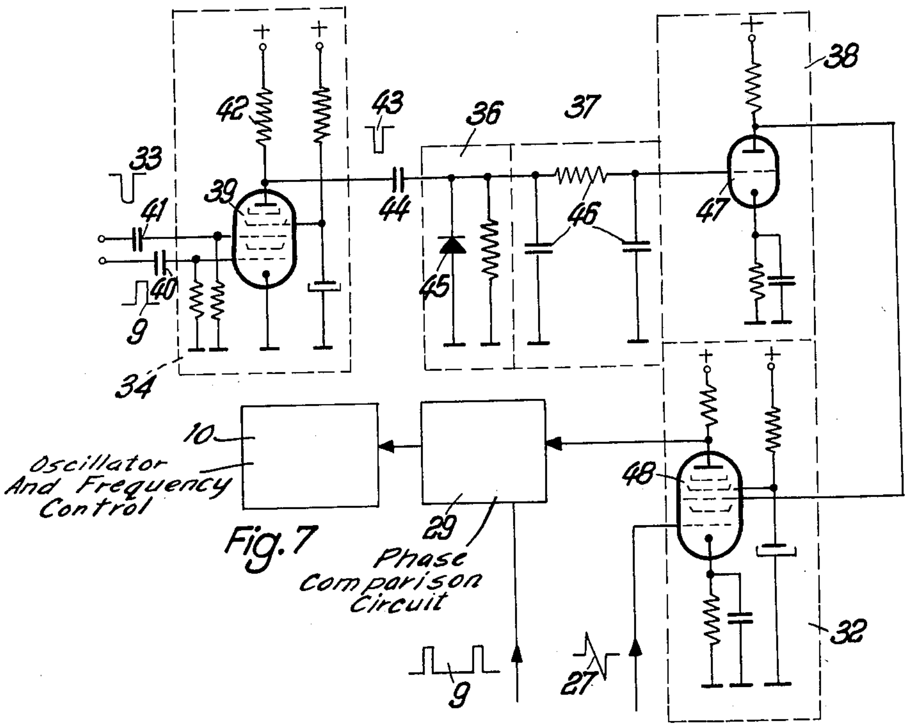
FIGURE 7 is the schematic diagram of the form of invention shown in FIGURE 6.

Another modification is shown in the embodiment of FIGURES 6 and 7, comprising an oscillator 10 controlled by a phase comparison stage 29. A comparison wave 27 having a control slope is derived from the oscillator 10 and is fed to the phase comparison stage 29 via a differentiation stage 35 and an amplifier 32. The phase condition of the voltage 27 and of a received synchronizing pulse sequence 9 is compared in this phase comparison stage 29. Comparison pulses 33 are simultaneously obtained from the oscillator 10 at potentiometer 58, FIGURE 9, and are fed to a further phase comparison circuit 34, where they are compared with the synchronizing pulse sequence 9. The voltage derived from the phase comparison stage 34, the magnitude of said voltage depending upon the degree of synchronization, is fed to a peak rectifier 36 and from the latter to an amplifier 32 via a filter 37 and, if necessary, a control voltage amplifier 38. The amplifier 32 is designed in such a manner that the control curve achieved by differentiating pulses 33 in differentiator 35 is amplified with low steepness while the synchronization is good, i.e., the phases of the received synchronizing pulse sequence 9 and of the comparison pulses 33 are the same, whereas, in case of poor synchronization, the control curve at the input of the phase comparison stage 29 has a relatively large steepness.

In the circuit diagram of FIGURE 7, details of the circuit shown in FIGURE 6 are illustrated, wherein the individual blocks of FIGURE 6 are indicated by dash-dash lines. The comparison pulses 33 and the synchronizing pulse sequence 9 are fed with different polarity to different grids of a multiple grid tube 39 in the phase comparison stage 34 via condensers 40 and 41, said multiple grid tube being grounded at its cathode, so that a voltage depending upon the relative phase condition of the pulses is obtained at the anode resistance 42 of this tube. In the event of phase coincidence and with suitable design of the circuit, the pulses may cancel out one another with respect to their action across the anode resistance 42. However, when the phase position of two pulse sequences is different to such an extent that the pulses do not coincide, a pulse voltage 43 is obtained which is fed to a diode 45 via a condenser 44 for the purpose of peak rectification. The output voltage of the peak rectifier 45 is fed to the amplifier 32 via a filter 46 and the control voltage amplifier 38 containing an amplifier tube 47. The amplifier 32 comprises a multiple grid tube 48, to one grid of which is fed the voltage 27 derived from the circuit 10, in accordance with FIGURE 6, and to another grid of which is fed the control voltage depending upon the coincidence of the comparison pulse 33 and the synchronizing pulse 9. This circuit is designed in such a manner that the tube 48 has relatively low amplification in the range of coincidence and relatively high amplification in the range where poor coincidence occurs. As a result of this, this circuit is less susceptible to disturbances in case of good synchronization while, after a failure of synchronization, for example, due to continued failure of the synchronizing pulses, the synchronized condition is quickly restored.

It is possible to inject the comparison pulses 33 and the synchronizing pulse 9 into the multiple grid tube 39 with the same polarity. In this case, a voltage appearing at the output of the peak rectifier in case of coincidence, said voltage corresponding to the total of the pulse amplitudes, would generally have about the double value obtained in the case of no coincidence.

Figure 8:
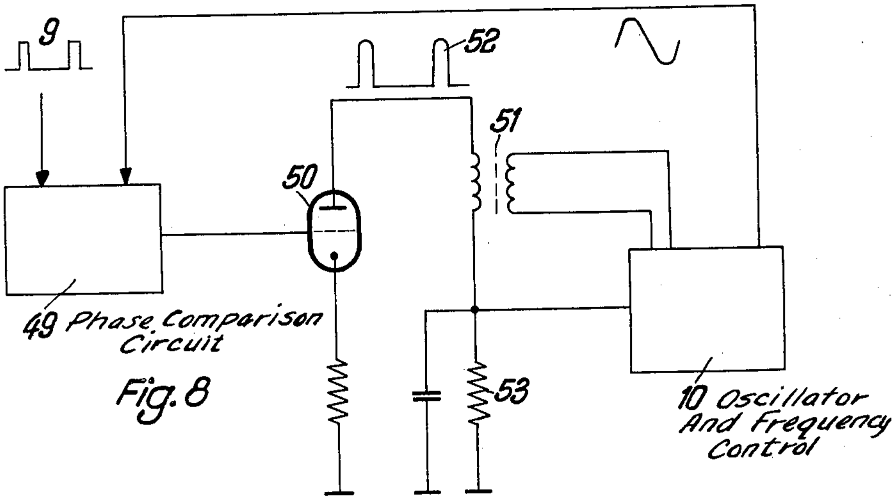
FIGURE 8 is a further modified form of the invention shown partly in block form and partly in schematic form.

In the embodiment of the invention of FIGURE 8, a keyed control voltage amplifier with low amplification in case of coincidence is used. In this circuit arrangement, the control voltage obtained in a phase comparison circuit 49 is combined with the incoming pulse 9, for example, by making the phase comparison circuit somewhat unsymmetrical, so that a tooth-shaped component is superimposed on the D.C. voltage. This voltage curve is fed to the control grid of the keyed control voltage amplifier tube 50 which can be a triode or a pentode. Positive pulses 52 are fed to the anode of this tube 50 via a transformer coupling 51. Such pulses 52 are available, for example, at the line transformer during the return sweep. As a result of this, a negative D.C. voltage is obtained at the load resistance 53 of the tube 50, said D.C. voltage being dependent upon the magnitude of the grid voltage applied. The control curve appearing at the input of the oscillator 10 has then, likewise, substantially the form shown in FIGURE 2, because this control voltage amplifier constitutes simultaneously a coincidence circuit. The phase comparison circuit is suitably designed in such a manner that the return sweep period of the saw-tooth, which is superimposed on the D.C. voltage, corresponds approximately to the duration of the synchronizing pulses.

In the circuit arrangement described in the foregoing, it is possible under certain circumstances that the phase condition of the synchronizing pulse is adjusted in such a manner that the control curve does not have the desired flat form. In such a case, the control circuit would be very susceptible to disturbances.

In order to avoid this disadvantage, additional controllable and frequency-influenced circuit components will be associated with the oscillator, said components being controlled by a control voltage derived from the phase comparison circuit via a filter having a relatively long time constant, in such a manner that the fundamental frequency of the oscillator, in case of a longer lasting deviation, is tuned to the frequency of the synchronizing pulses. As a result of this, the flat part of the control curve in the vicinity of synchronism is always shifted to the point of the control slope to which the pulse is adjusted. Such circuit arrangement is illustrated in FIGURE 9, wherein an output voltage $U_R$ of the phase comparison circuit 8 is fed to an input electrode of the oscillator 10 via a filter 54 of relatively short time constant, said voltage depending upon the voltage curve 14. The oscillator 10 comprises a socalled sine oscillator employing a multiple grid tube 55, the cathode of which is grounded via a resistance 56 and a potentiometer 57. A pulse-shaped wave similar to wave 33 is fed from the tap 58 of this potentiometer to the phase comparison circuit 8. The second and fourth grids of the tube 55 are interconnected. The lower part of the tube acts as a sine oscillator in which the first grid is connected to a terminal of an inductance 61 via a condenser 69, while the other terminal 67 is connected with the second and, thereby, the fourth grid via a shunt circuit comprising a resistance 59 and a condenser 60. A condenser 62 is shunted across a part of the inductance 61, said condenser being adapted to tune or adjust the oscillator to the sweep frequency. The inductance 61 may be provided with a movable core, in order to precisely adjust the frequency. The common point 63 of the condenser 62 and the inductance 61 is connected to the supply voltage source $U_B$. The anode of the tube 55 is connected to ground via a condenser 65. The amplitude of the voltage across this condenser, inverted in phase, is controlled by the control voltage fed via the filter 54, said phase-inverted voltage corresponding to the frequency of the oscillator. The voltage at the condenser 65 is fed to the inductance 61 via a resistance 66. The oscillator voltage is derived from the point 67 of the inductance and is fed to a subsequent stage of the deflection circuit shown as a block S.

The circuit described thus far has been known per se. The sine oscillator oscillates at the adjusted frequency, the magnitude of which is automatically matched or adapted to the received synchronizing pulse sequence via the phase comparison circuit 8 and the reactance tube which is a part of the tube 55. The additional phase comparison circuit 34 with a triode 70 serves for the automatic change in the slope, whereby the negatively directed synchronizing pulse sequence 9 is fed to the control grid of this triode and comparison pulses 71 are fed from the line transformer 71a to the anode of the triode. A voltage depending upon the coincidence appears at the anode resistance 72 of the triode, said voltage being fed to a diode 73 for rectification. The voltage appearing at the load resistance 74 of the diode 73 is fed to the control grid of an amplifier tube 75 via the filter 46. The cathode potential of the diode 73 is adjusted by means of a potentiometer 76 inserted between the operating voltage $U_B$ and ground. The apparatus is designed in such a way that a voltage 77 derived from the oscillator 10 is amplified depending on the coincidence and is fed to the phase comparison circuit via the line 78 with a more or less steep slope.

If the sine oscillator is adjusted in such a manner that the pulses lie just above the extremity of the control characteristic curve, it is possible to then control the oscillator via the phase comparison circuit to the extent that the pulses will not lie in the center of the control slope, so that the circuit arrangement is operated in the range of the steep control curve with a high susceptibility to disturbances. To avoid this disadvantage, the output voltage of the phase comparison circuit 8 is fed in addition to the filter 54 to a filter 79 of relatively long time constant, the other end of said filter being connected to the common point of a diode 80 and a condenser 81. This diode 80 and this condenser 81 are connected in series and shunted across the inductance 61 of the sine oscillator. Due to the long time constant of the filter 79, a control voltage appears at the diode 80, said voltage being based on a displacement of greater duration between synchronous pulse and comparison pulse. Therefore, the resistance of the diode 80 and, thereby, the tuning action of the condenser 81 with reference to the inductance 61 is altered by said control voltage, whereby the phase relation between comparison pulse and synchronous pulse is restored.

Figures 10A, 10B, 10C, 10D:
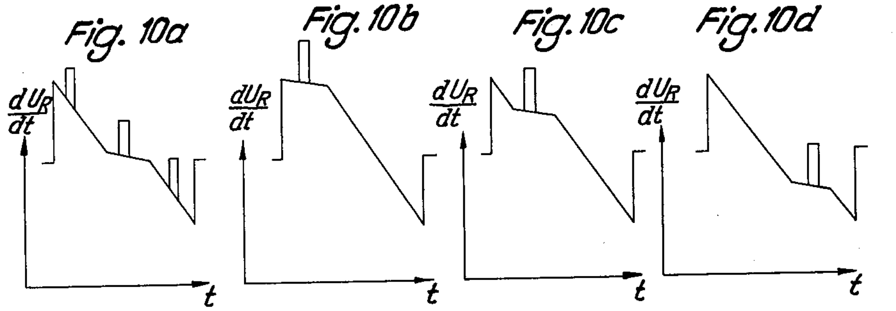

With reference to the diagrams of FIGURES 10*a*, 10*b*, 10*c* and 10*d*, showing the differential quotient of the control voltage plotted against a time axis, a characteristic curve according to FIGURE 10*a* is obtained for the circuit arrangement of FIGURE 9, if the circuit components 79, 80 and 81 are omitted. Due to the action of these latter circuit components, the flat portion of the curve is shifted to the position at which the synchronous pulses are adjusted (see FIGURES 10*b*, 10*c* and 10*d*). The control operation takes place in such a manner that, in case of a sudden and large frequency change, for example, of the synchronizing step, the phase control occurs first at a high control rate. After expiration of a time period given by the relatively long control time constant of the components 79, 80 and 81 of the circuit, the self or inherent frequency of the oscillator is adjusted in such a manner that the control curve affecting oscillator is displaced from the phase center towards the synchronous pulse. Another possibility to adjust the synchronous pulse exactly to the flat portion of the control curve resides in the reversing of the control direction of the sweep oscillator in polarity depending upon the position of the synchronizing pulses in such a manner, that the phase of the pulses is displaced into the flat range. It would be possible to change the polarity of the oscillator, depending on whether the phase pulse is lying left or right from the coincidence position, by using a coincidence pulse according to FIGURE 11, whereby different voltage conditions are present at the left and right with the result that respective reactances are switched on or off, for example, via diodes.

It is furthermore possible to change the symmetry of the phase comparison circuit.

In addition, it is possible to provide the amplitude of the comparison oscillation derived from the oscillator with a relatively flat control slope in the synchronous range and to considerably increase this amplitude if the phase deviation of the oscillation to be compared exceeds the locked-in range, i.e., the oscillator will fall out of step. In this case, a coincidence measuring step of the pulses to be compared is used, wherein the comparison pulse has such width that the phase difference of its slope equals the phase width of the locked-in range. By increasing the control steepness, the locked-in range is increased and, thereby, also the pull-in range in such a manner that synchronism is restored even in case of larger deviations from the desired frequency.

Such a synchronization circuit is illustrated in FIGURE 12, wherein a synchronizing pulse sequence 9 and a comparison oscillation 82 are fed to the phase comparison circuit, said comparison oscillation 82 being derived from the oscillator or from the circuit connected thereto. The pull-in range in synchronized condition is made relatively small, for example, 50 cycles, so that this circuit arrangement is insensitive to disturbances. As a result of this, the oscillator, ordinarily, could not be pulled in after falling out of step, for example, in case of transmitter switching.

In order to make it possible that the oscillator can be automatically pulled in in case of such a small pull-in range, the differentiated comparison pulse of the phase comparison circuit is fed via an amplifier 83 rather than directly to the phase comparison circuit, the amplification of this amplifier being controlled by a coincidence circuit 84. This coincidence circuit 84 comprises an amplifier tube 85, to the control grid of which the synchronizing pulse sequence 9 of the separating stage ECL80 is fed and to the anode of which positively directed comparison pulses 86 are supplied. As a result of this, a voltage will appear at the anode resistance of the tube 85, said voltage being dependent upon the coincidence of the two pulses 9 and 86, whereby this voltage is rectified by means of a diode 87. After filtering by means of the filter 88 the diode output voltage is fed to the amplifier tube 83. Since the pulse 86 serves on the one hand as a comparison oscillation 82 after differentiating, and on the other hand is fed as a comparison pulse to the coincidence circuit, the change in amplification of the tube 83 occurs when the synchronizing pulse 9 leaves phase coincidence with the comparison pulse 86 and, thereby, of the comparison oscillation 82. The comparison oscillation 82 virtually represents the extent of the pull-in range. When the synchronous pulse 9 leaves the pull-in range, the diode output voltage of the coincidence circuit becomes lower, so that the amplification of the tube 83 is increased. As a result of this, the steepness of the phase comparison circuit slope is increased, whereby the pull-in range and, thereby, the locking-in range are enlarged. If, due to the action of the thus enlarged pull-in range, the coincidence of the pulses is restored, the tube 83 reverts again to a lower value to diminish the susceptibility to disturbances in the synchronization circuit. The time constant of the filter 88 is designed in such a way, that the amplification of the tube 83 is changed only after a time delay. As a result of this, changing of the control steepness is avoided in case of the brief failure of a few line pulses and during the pull-in itself. The diode 87 is connected to a potentiometer for adjusting the bias voltage of the diode, whereby the action of the phase-dependent changing of the control steepness can be altered. Due to the action of this changing, the magnitude of the pull-in range is increased from ±50 cycles in the synchronized state to, for example, ±450 cycles in the non-synchronized state.

The coincidence circuit can be simplified according to FIGURE 13, by feeding comparison oscillations 77 from a sweep deflection transformer (not shown) to the control grid of the amplifier tube 83, said oscillations being derived from the return pulse by differentiation, whereby only the positive parts or components, particularly their peaks, render the tube 83 conductive. An oscillating circuit 90, tuned to the frequency of the synchronizing pulse sequence, is inserted in the anode circuit of the cut-off tube 89. The oscillations initiated by the synchronizing pulses in this oscillatory circuit are fed to the control grid of a clipping triode 92 via an inductance 91 coupled with the oscillatory circuit, said clipping triode 92 being dimensioned in such a way, that it is overdriven and, thus, amplifies only a portion of the sine-shaped oscillations 93. As a result of this, a negatively directed pulse sequence 95 will appear at the anode resistance 94 of the triode 92, said pulse sequence being fed to the third grid of the tube 83. The triode 92 is designed in such a way, that the width of the pulses of the sequence 95 is greater than the width of the positively directed portions of the comparison oscillation 77. A differential transformer 96 is inserted in the anode circuit of the tube 83, said transformer being adapted to convert the pulses amplified to a greater or lesser extent into two-sided pulses 97. While it is possible to use one-sided comparison pulses in place of the illustrated two-sided comparison oscillation 77, the embodiment illustrated has the advantage that the phase width of the pulling-in range is decreased, due to the "double" differentiation. If, as illustrated in FIGURE 14*a* and FIGURE 14*b*, phase coincidence exists between the pulse 95 and the positive portion of the pulse 77, the amplification of the tube 83 during the duration of the pulse 77 is decreased, due to the negatively directed pulse 95, and the output pulse of the tube 83 and, thereby, the differentiated pulse 97 has a correspondingly lowered amplitude. When the phase condition deviates from the correct value, as shown in FIGURE 14*b*, the amplification of the tube 83 for pulse 77 is increased in accordance with the position of this pulse on the slope of the pulse 95, so that the amplification of the tube 83 is correspondingly increased. The so-called advance synchronization is avoided by the use of the peaks of the original comparison oscillations, said synchronization being caused by a wavy base between the comparison oscillations and appearing as a vertical black line in the picture.

We claim:

1. Circuit arrangement for the synchronization of an oscillator with a synchronizing pulse sequence, comprising a first phase comparison circuit receiving said pulse sequence and a voltage from said oscillator and delivering an output voltage proportional to the degree of coincidence; amplifier means for amplifying said output voltage and delivering an amplified control voltage; control means receiving said amplified control voltage and controlling the phase and frequency of said oscillator to restore phase coincidence of its output with respect to said pulse sequence; and a second phase comparison circuit receiving said pulse sequence and said oscillator voltage, and delivering an output wave dependent upon the degree of phase coincidence, said output wave being applied to said amplifier means to control its amplification and thereby to control the magnitude of the pull-in effect of said control voltage on said control means in proportion to the deviation of said oscillator from synchronism.

2. In a circuit arrangement according to claim 1, the second phase comparison circuit comprising a coincidence circuit, the output voltage of which is a measure of the degree of coincidence between the synchronizing pulse sequence and a comparison voltage derived from the oscillator.

3. In a circuit arrangement according to claim 1, said control means including two diodes shunted with opposite polarity and controlling the steepness of said characteristic, the control voltage from said first comparison circuit being applied between the cathode of the one diode and the anode of the other diode.

4. In a circuit arrangement according to claim 1, a filter of relatively long time constant interposed between said second comparison circuit and said amplifier, whereby transients and brief fading of the synchronizing pulses will not affect the average pull-in control voltage value.

5. In a circuit arrangement according to claim 4, said oscillator having a frequency determining circuit; a condenser and a diode connected in series with each other and shunted across the frequency determining circuit; a filter of long time constant connected to the junction of the diode with the condenser, and said control voltage of the first phase comparison circuit being connected by said filter to said junction.

6. In a circuit arrangement according to claim 4, said oscillator having a frequency determining circuit; a reactance tube shunted across said frequency determining circuit; a filter of long time constant connected to said reactance tube; and said control voltage of the first phase comparison circuit being connected by said filter to control said reactance tube.

7. In a circuit arrangement according to claim 4, the control direction of the control means being reversed in dependence on the direction of phase displacement of the synchronizing pulses with respect to the oscillator voltage.

8. In a circuit arrangement according to claim 1, the steepness of the control characteristic being small in the vicinity of phase coincidence and increasing with increasing deviation from phase coincidence.

9. In a circuit arrangement according to claim 1, the first comparison circuit supplying an output voltage which varies in either direction, depending on the direction of departure from phase coincidence; and the second comparison circuit delivering an output wave having an amplitude which varies with the degree of departure from phase coincidence; means to rectify this wave to make it unidirectional, said amplifier coupling the first output voltage to said control means, the rectified unidirectional wave being applied to the amplifier to control its gain and thereby control the steepness of said characteristic.

10. In a circuit arrangement according to claim 9, the rectified output wave of the second comparison circuit being fed to said amplifier via a filtering member having a long time constant.

11. In a circuit arrangement according to claim 10, a potentiometer for adjusting the action of the output voltage of the second comparison circuit on the control means, said potentiometer being connected between a source of bias and said rectifying means to adjust the reference potential thereon.

12. In a circuit arrangement according to claim 1, said amplifier having one control electrode to which the voltage generated in synchronism with said oscillator is connected and having another control electrode to which the pulse sequence corresponding to the desired frequency is applied, the gain of the amplifier determining the steepness of said control characteristic, and a clipper tube coupling said generated voltage to said one control electrode and applying thereto only negative cycles, the amplitude of which is maximum when the phase coincidence is best, whereby the amplifier has minimum gain when the phases are in coincidence.

13. In a circuit arrangement according to claim 12, said voltage being generated in an oscillating circuit tuned to the desired coincidence frequency of the synchronizing pulse sequence and excited thereby to drive said clipper tube on positive half cycles to produce in its output said negative cycles.

14. In a circuit arrangement according to claim 12, the clipper tube being biased in such a manner that the width of the negative cycles is greater than the width of the pulses applied to the electrodes of the amplifier.

15. In a circuit arrangement according to claim 12, the output pulses of the amplifier being differentiated prior to their application to the control circuit.

References Cited in the file of this patent

UNITED STATES PATENTS

| | | |
|---|---|---|
| 2,479,817 | Curran | Aug. 23, 1949 |
| 2,541,454 | White et al. | Feb. 13, 1951 |
| 2,588,094 | Eaton | Mar. 4, 1952 |
| 2,833,923 | Gruen | May 6, 1958 |